(12) United States Patent
Ewerhart et al.

(10) Patent No.: US 7,363,140 B2
(45) Date of Patent: Apr. 22, 2008

(54) LANE CHANGING ASSISTANT FOR MOTOR VEHICLES

(75) Inventors: Frank Ewerhart, Weinsberg (DE); Clemens Guenther, Ettlingen (DE); Thomas Wittig, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 11/155,832

(22) Filed: Jun. 17, 2005

(65) Prior Publication Data

US 2006/0009910 A1   Jan. 12, 2006

(30) Foreign Application Priority Data

Jun. 17, 2004   (DE) ...................... 10 2004 029 369

(51) Int. Cl.
*B60K 31/02* (2006.01)
*G05D 1/02* (2006.01)

(52) U.S. Cl. .......................................... 701/96; 701/70
(58) Field of Classification Search ...................... None
See application file for complete search history.

(56) References Cited

U.S. PATENT DOCUMENTS

| | | | | |
|---|---|---|---|---|
| 5,521,579 A * | 5/1996 | Bernhard | ................... | 340/438 |
| 6,304,811 B1 * | 10/2001 | Prestl | .......................... | 701/96 |
| 6,879,901 B2 * | 4/2005 | Winner et al. | ................. | 701/93 |
| 7,038,577 B2 * | 5/2006 | Pawlicki et al. | ............ | 340/435 |
| 7,085,633 B2 * | 8/2006 | Nishira et al. | ................. | 701/36 |
| 2005/0004744 A1 * | 1/2005 | Dieckmann et al. | .......... | 701/96 |
| 2005/0256630 A1 * | 11/2005 | Nishira et al. | ................. | 701/96 |
| 2006/0261936 A1 * | 11/2006 | Widmann et al. | ........... | 340/435 |

FOREIGN PATENT DOCUMENTS

| | | |
|---|---|---|
| DE | 19821122 | 6/1999 |
| DE | 101 14 187 | 9/2002 |
| DE | 10109046 | 9/2002 |
| DE | 10118265 | 10/2002 |
| EP | 0 44 31 85 | 8/1991 |

\* cited by examiner

*Primary Examiner*—Michael J. Zanelli
(74) *Attorney, Agent, or Firm*—Kenyon & Kenyon LLP

(57) ABSTRACT

A lane changing assistant for motor vehicles, having a speed control system and a surroundings sensor system for recording the traffic environment including the traffic in an adjacent lane, having a decision device for deciding whether a lane changing request of the driver is to be accepted, and having a command device for issuing an acceleration command to the speed control system in the case of a lane changing request, wherein a recognition device is developed to recognize a window for swinging into the adjacent lane without danger, in the light of the data of the surroundings sensor system; and the command device is developed to compute an acceleration strategy adjusted to the window, including a point in time for the beginning of the acceleration.

6 Claims, 5 Drawing Sheets

LANE CHANGING ASSISTANT FOR MOTOR VEHICLES

FIELD OF THE INVENTION

The present invention relates to a lane changing assistant for motor vehicles, having a speed control system and a surroundings sensor system for recording the traffic environment including the traffic in an adjacent lane, having a decision device for deciding whether a lane changing request of the driver is to be accepted, and having a command device for issuing an acceleration command to the speed control system.

BACKGROUND INFORMATION

A lane changing assistant of this kind is known, for example, from German Published Patent Application No. 101 14 187, and is used in connection with a speed control system, for instance, a so-called ACC system (Adaptive Cruise Control), which is not only in a position to regulate the speed of the vehicle to a speed desired by the driver, but is also in a position to adjust the speed of one's own vehicle, if necessary, to the speed of the preceding vehicle, so that the latter is being followed at a suitable safety distance. For this purpose, a surroundings sensor system is present, for example, in the form of a radar sensor, using which the distances and also the relative speeds of preceding vehicles may be measured. Such ACC systems are particularly provided for travel on multi-lane expressways or Autobahns.

The lane changing assistant is used to make it easier for the driver to change to an adjacent lane, for instance, when he wishes to start on a passing procedure.

The lane changing assistant known from the abovementioned document is developed in such a way that, when a lane changing request by the driver is detected, it automatically initiates an acceleration procedure, so that pulling into the flowing traffic in the adjacent lane is made easier. The target speed or passing speed to be reached in this acceleration procedure, in this context, depends not only upon the speed of the vehicle, that is to be passed, proceeding ahead in one's own lane, but also upon the speed of one or more additional vehicles that are located in the adjacent lane, ahead of one's own vehicle. In this manner, one is able to avoid running up too closely to the vehicle in the adjacent lane.

A passing intention by the driver is recognized by the known system in that, for example, the driver activates the respective direction indicator (blinker). When the passing intention is recognized, the acceleration procedure is then triggered immediately.

In the same document the possibility is also mentioned that one might, for example, monitor the traffic following in the adjacent lane, using a rear-facing radar, and, when the follow-on traffic permits a passing procedure, to suggest a passing procedure to the driver automatically, by a suitable signal, which the driver may then confirm or not confirm.

Furthermore, lane changing assistant systems such as blind spot warning systems are known which, with the aid of the surroundings sensor system, record the adjacent lane at the side of the vehicle and behind the vehicle, and warn the driver optically, acoustically or haptically when there is a lane change and a vehicle is located in the blind spot. However, the emission of such a warning signal may be disturbing to the driver, may be overlooked or may be wrongly interpreted by the driver.

SUMMARY OF THE INVENTION

The present invention offers the advantage that changing lanes is made easier for the driver in that the lane changing assistant automatically recognizes a suitable window for a danger-free changing to the adjacent lane, and, in the light of this information, automatically determines the most favorable point time to initiate the acceleration procedure.

Consequently, in this system the recognition of a desire to pass and the actual initiation of the corresponding acceleration procedure may occur at different times. If, for example, the driver makes it known that he wishes to pass, by setting the blinker, but a danger-free lane change is not possible at this point in time, because there is another passing vehicle in the adjacent lane that has not yet gained a sufficient safety distance from one's own vehicle, the driver's desire to pass is registered and taken into consideration by the lane changing assistant according to the present invention, but the initiation of the acceleration procedure is performed only at a later point in time, namely, when the vehicle that is passing has moved away at a sufficient safety distance. In the case where an additional vehicle is following the passing vehicle in the adjacent lane, and the gap or the "window" between these vehicles is too small, the acceleration procedure continues to be put on hold until the second vehicle has also concluded its passing procedure. In this way, the driver gets very effective support with the decision as to whether and when a danger-free lane change may be made. In this context, it is particularly advantageous that the surroundings sensor system, formed, for instance, by radar sensors, is able to measure and evaluate the relevant distances and the relative speeds substantially more accurately than would be possible to a human driver, especially an inexperienced driver. Thus, a considerable contribution to traffic safety is made by the present invention.

Preferably, the initiation of the acceleration procedure by the lane changing assistant forms a signal at the same time that indicates to the driver that a lane change is possible. In addition, it may be expedient if the acceleration procedure sets in at a certain minimum acceleration, which, to be sure, is not perceived to be uncomfortable by the vehicle's passengers, but on the other hand is clearly perceptible by the driver, so that the driver obtains a recognizable feedback. In this case, one may do without the additional emitting of optical or acoustical signals.

The information transmitted to the driver by the initiation of the acceleration procedure may, on the one hand, be used to accept the desire to pass, as signaled by setting the blinker. When, on the other hand, the driver operates the blinker switch and thereupon the expected acceleration thrust does not occur, this indicates to the driver that a lane change is not yet possible.

As a rule, known blinker switches are developed to have two stages, and in the first stage they act as a pushbutton switch without automatic holding function, while in the second stage they lock into place in a switched in state. According to one refinement of the present invention, the blinker switch may be developed in such a way that the operation of the first stage acts to switch on the directional indicator only if a lane change is actually possible. If, on the other hand, the lane change is not possible, the blinker light is switched on effectively only if a suitable window for lane change has opened. In this manner one may avoid irritating the traffic in the passing lane by the premature setting of the blinker. The lighting up of the blinker control light on the dashboard then gives the driver an additional signal that lane change is possible. The second stage of the blinker switch gives the driver the possibility of overriding this function and switching on the blinker light at once.

On the other hand, the acceleration thrust triggered by the lane changing assistant may also be used for providing the driver with a passing procedure. If a passing lane is available, and if the speed of a vehicle preceding in one's own lane is lower than the speed selected by the driver as his desired speed, one may generally impute a desire to pass to the driver. Then, if the lane changing assistant detects a window for the lane change, it is signaled to the driver, by the acceleration that is setting in, that he may now initiate the passing procedure. The driver may then, on his part, confirm this by setting the blinker. If, within a suitable time interval, the confirmation is not forthcoming, the acceleration procedure is broken off, and distance regulation with respect to the preceding vehicle is taken up again.

Optionally or in supplement, other criteria for the recognition of the driver's desire to pass may also be drawn upon, such as steering motions and the like.

For a reliable recognition of the window for a lane change, the surroundings sensor system should also be in a position not only to monitor only the traffic in the rear on the adjacent lane, but also to detect vehicles which are at approximately the same level with one's own vehicle. Whereas a radar sensor is generally expedient for monitoring the rear space, which also permits the measurement of relative speeds, for monitoring the space next to one's own vehicle one has the choice of a very close range sensor, such as a very close range radar, a short-range lidar system, a video system or even the use of ultrasound sensors. The speed not directly measurable by such sensors of the vehicle traveling level with one's own vehicle may, in the case of passing vehicles be estimated by extrapolation of the speed previously measured with the aid of the rear space radar.

Depending on whether the vehicle will be used in a country that drives on the right or on the left, the surroundings sensor system may be developed for monitoring one of the two vehicle sides or even for monitoring both vehicle sides. In the latter case, the system may also support the driver when he returns to the slower traffic lane.

The monitoring of the traffic on the adjacent lane may be performed permanently or take place only when a desire for a lane change is detected or is to be accepted.

The following criteria are important for the detection of a suitable lane changing window: the distances of the vehicles from one another, the sizes of the gaps, that is, the spatial window between the vehicles on the adjacent lane, and the relative speeds of the vehicles in the adjacent lane, and thus the relative speeds of the gaps. What has also to be taken into consideration is the safety distances between the individual vehicles, the acceleration capacity of one's own vehicle and, possibly, a boundary value for a certain deceleration that may be "expected" of a following vehicle. In the case of the safety distances, one should distinguish between the regular safety distances or time gaps during longer lasting travel in column and smaller minimum clearances which may not be undershot even for a short period of time. With respect to the acceleration capacity of one's own vehicle, one should possibly also take into consideration limitations that may derive from a comfort point of view, the maximum payload and the like.

Upon detection and selection of a window for the lane change, one may proceed, for example, as follows. First of all, using the very close range sensor, a check is made as to whether there is a vehicle in the adjacent lane that is approximately level with one's own vehicle. If this is not the case, it is checked whether the gap between the directly preceding vehicle in the adjacent lane and the directly following vehicle in the adjacent lane is big enough to permit swinging in, in consideration of the safety distances (minimum distances). In the case of commercial vehicles or vehicle combinations, one should also possibly take into consideration the length of one's own vehicle, in this connection. If the gap is large enough, it is checked, using the relative speed, whether it is possible to accelerate one's own vehicle to such an extent that the following vehicle in the adjacent lane, after the lane change, is able to maintain a sufficient safety distance from one's own vehicle.

This condition is preferably regarded as not being satisfied if the distance of the following vehicle, at the instantaneous point in time, is already less than the minimum distance. It is theoretically conceivable, to be sure, first to accelerate one's own vehicle before the lane change, in order to produce the minimum distance, but in this context, there is the danger that the minimum distance from the vehicle to be passed is undershot, and that it is difficult for the driver to time well the right point in time for the lane change. Therefore, for safety reasons, one should not make use of this possibility.

In view of these criteria, if it comes to the point that a safe lane change is not possible, in analogous fashion, one after another, advancing backwards, the gaps between the following vehicles in the adjacent lane are investigated. When a suitable gap has been found, a time window may be determined from the lengths of these gaps, the clearances and the relative speeds, within which the lane change is possible. The limits of this time window then form the basis for the determination of that point in time at which the acceleration procedure is initiated.

Then, in order to calculate a suitable acceleration strategy, the following, mutually dependent, parameters may be determined: the point in time at which to begin acceleration, the target speed to be reached at the end of the acceleration procedure and the magnitude of the acceleration of one's own vehicle. This magnitude may be constant, in the simplest case, but in general it may also be time-dependent.

For the establishment and calculation of these parameters, various algorithms are conceivable. One approach is, while taking into consideration the acceleration capacity of one's own vehicle and points of view concerning comfort, first to establish a suitable value for the acceleration as well as a suitable value for the target speed, which should be reached at the latest possible lane changing point in time, and then, in the light of these values, to calculate the point in time to begin the acceleration. In this context, depending on the situation, the target speed may be the speed of the preceding vehicle in the adjacent lane, the speed of the following vehicle in the adjacent lane or a suitable compromise between these two. In order to shorten the passing procedure, in this context, exceeding of the desired speed selected by the driver, that is moderate and limited in time, may also be permissible. An increase in comfort may be achieved by only providing a gradual increase and decrease in the acceleration, using a limited rate of change, when establishing the acceleration, apart from the abovementioned acceleration thrust by which the passing possibility is signaled to the driver.

One alternative approach is that, for the distance of the vehicle that is marked by the front end of the swing-in gap, and/or for the distance of the vehicle that is marked by the rear end of the swing-in gap, an optimal path/time curve, that is characterized by accelerations that are as small as possible, is established, and then the acceleration curve is derived from this curve.

Finally, under consideration of the distance and the relative speed of the vehicle to be passed, one may establish a suitable breaking-off criterion for the case in which the driver, after the acceleration procedure has been initiated, does not confirm the lane changing desire by setting the blinker, by corresponding steering actions, or the like, and/or does not initiate the lane changing procedure by an appropriate steering action. In this case, the acceleration procedure should be broken off in time in such a way that the normal clearance control may be broken off again without undershooting of the minimum distance and without uncomfortably large vehicle decelerations. Expediently, the determination of this break-off criterion is made by calculating a break-off point in time up to which the driver must have confirmed or executed the lane change.

DETAILED DESCRIPTION

Figure 1:
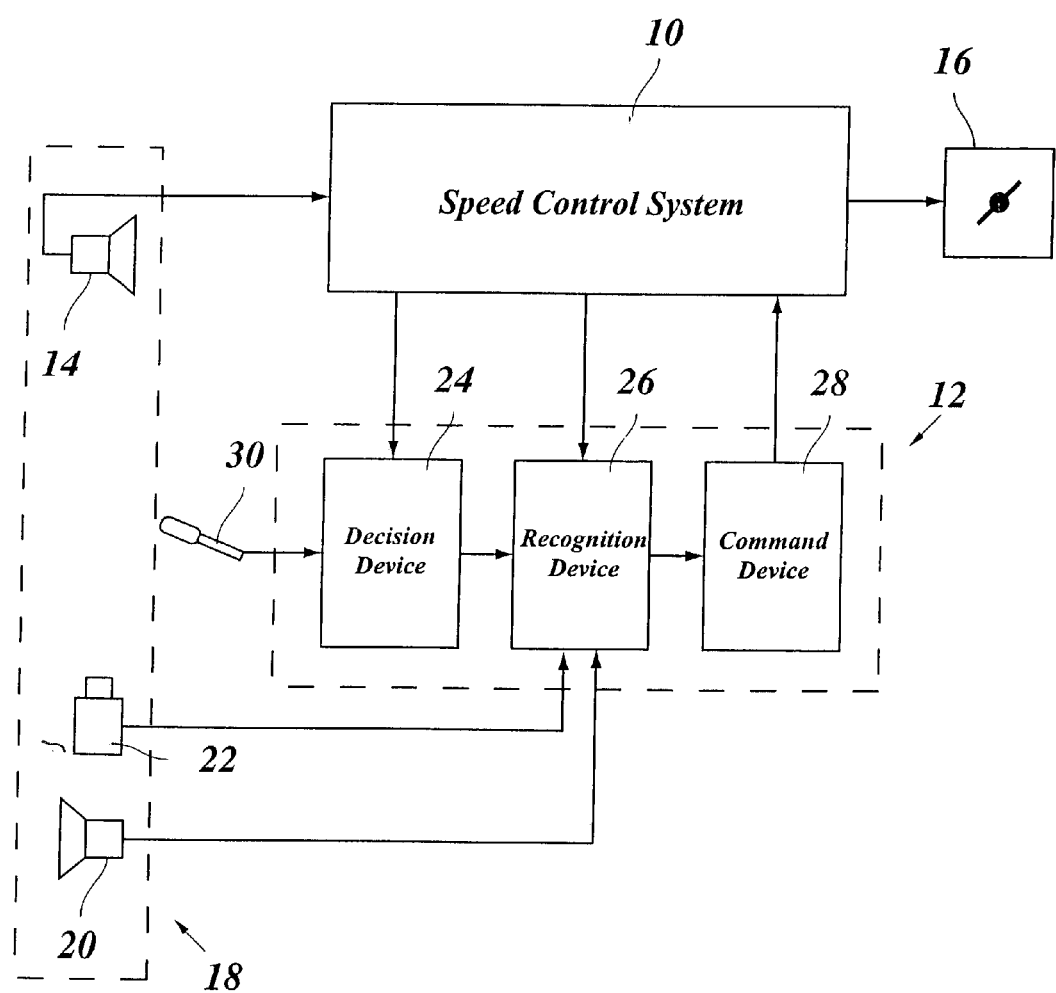
FIG. 1 shows a block diagram of a speed control system having a lane changing assistant according to the present invention.

As a simplified block diagram, FIG. 1 shows a speed control system 10 for a motor vehicle, and an appertaining lane changing assistant 12. Speed control system 10 receives signals from a front radar 14 and intervenes in drive system 16, as well as in the braking system of the vehicle, if necessary, that is not shown. The functions of speed control system 10 correspond to those of a known ACC system, and are therefore not explained here in greater detail.

Front radar 14 is a part of a surroundings sensor system 18, to which there also belongs a rear-facing radar 20 and a very close range sensor 22.

Lane changing assistant 12 is represented here by three function blocks, namely, one decision device 24 to decide whether a lane changing request should be accepted, a recognition device 26 to recognize a suitable lane changing window in flowing traffic in the adjacent lane, and a computing device 28 to compute an acceleration strategy, and to output a corresponding acceleration command to speed control system 10. In practice, the function blocks named of lane changing assistant 12 and of speed control system 10 may be formed by program modules which run on a microcomputer or a network of microcomputers.

In the example shown, let it be assumed that decision device 24 accepts a lane changing request of the driver if a passing lane is available, and if the absolute speed of the directly preceding vehicle in the driver's own lane, located by front radar 14, is less than the desired speed selected by the driver for the speed control. These data are made available by speed control system 10 to decision device 24. The availability of a passing lane may be recognized, for example, from the fact that angular resolution front radar 14 occasionally locates vehicles in the left adjacent lane (in the case of right-hand traffic). Furthermore, decision device 24 receives a signal from a blinker switch 30 that indicates the setting of the left blinker. In the example examined here, this signal is used to confirm the lane changing intention of the driver.

If decision device 24 decides that a lane changing request of the driver is to be accepted, it induces recognition device 26, with the aid of rear-facing radar 20 and very close range sensor 22 to monitor the traffic in the adjacent lane, behind and next to the driver's own vehicle, and to search for suitable swing-in gaps. When a swing-in gap has been found, the corresponding distance data and speed data are transmitted to command device 28, which establishes an acceleration strategy for pulling into the flowing traffic on the adjacent lane, and issues corresponding acceleration commands to speed control system 10.

Figure 2:
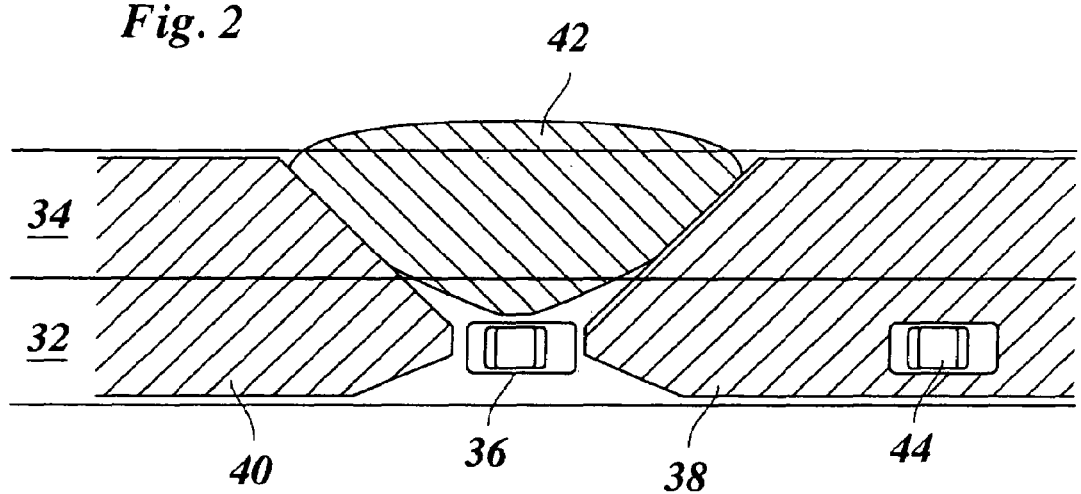
FIG. 2 shows a sketch of a traffic situation to explain the manner of functioning of the lane changing assistant.

FIG. 2 shows, in a top view, a two-lane roadway having a right lane 32 and a left adjacent lane 34 (passing lane). In right lane 32 there travels a vehicle 36 that is equipped with the system according to FIG. 1. The hatched areas show the locating range 38 of front radar 14, locating range 40 of rear-facing radar 20 and locating range 32 of very close range sensor 22. The front radar monitors the traffic in both lanes 32, 34 in front of vehicle 36, while the rear-facing radar monitors the traffic in adjacent lane 34, behind vehicle 36. It is true that locating range 40 of the rear-facing radar also records right lane 32, but, based on its angle-resolving capacity, the rear-facing radar is in a position to distinguish between the two lanes, and vehicles in right lane 32 are ignored. Locating range 42 of the very close range sensor closes the gap between locating ranges 38 and 40, so that the traffic in adjacent lane 34 is able to be monitored in a gap-free manner.

In the situation shown in FIG. 2, adjacent lane 34 is free, and ahead of vehicle 36 a slower vehicle 44 is traveling.

Figure 3:
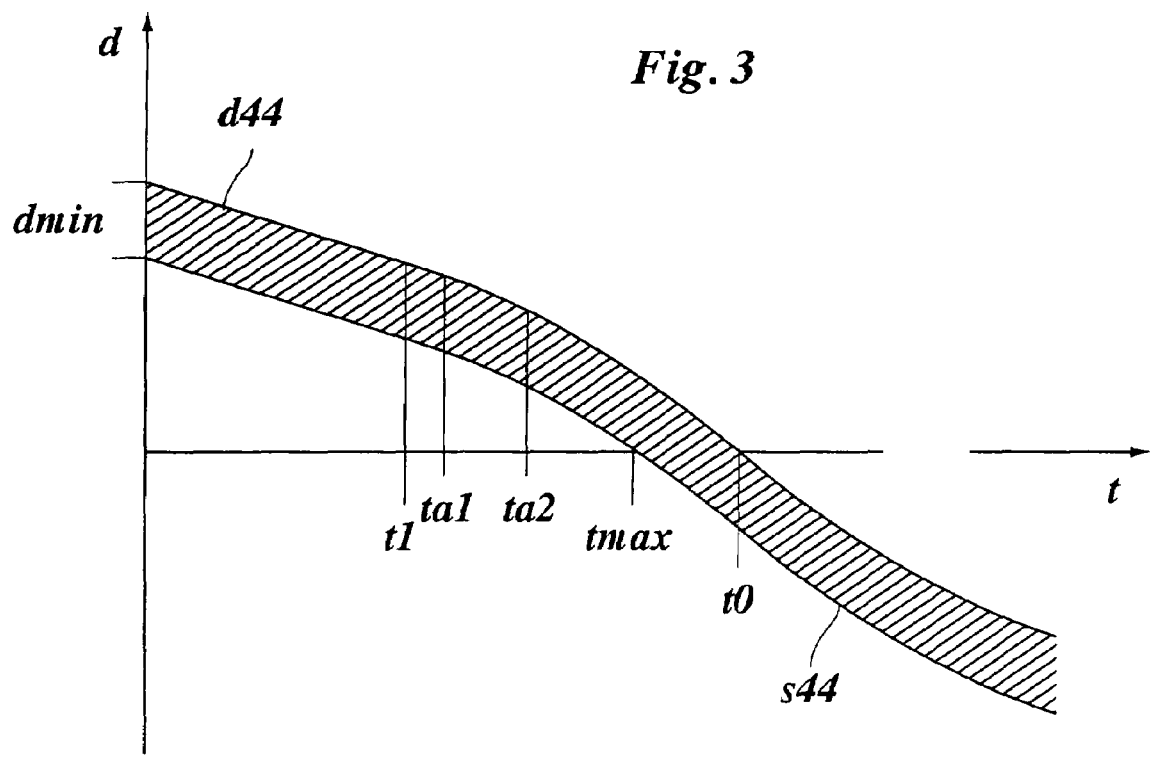
FIG. 3 shows a path/time diagram on what is shown in FIG. 2.

In FIG. 3, vehicle distance d is plotted against time t. Curve d44 gives the curve in time of the distance of vehicle 44 measured using front radar 14. Curve s44 in FIG. 3 differs from curve d44 by a minimum safety distance dmin which vehicle 36 is supposed to maintain with respect to vehicle 44.

First of all, up to point in time t1, both vehicles 36, 44 travel at constant speed, and, accordingly, curve d44 drops off linearly. Vehicle 36 travels at the intended speed of the driver. Since vehicle 44 is slower, decision device 24 decides that a passing intention, and thus a lane changing intention on the part of the driver should be accepted. Recognition device 26 thereupon looks for a swing-in window in adjacent lane 34, and, since this lane is free, swing-in window extends indefinitely. Therefore, the driver of vehicle 36 has great leeway in time, for carrying out the lane change.

If the driver does not make a lane change, at a point in time ta1 the ACC system would become active, and would cause a deceleration of vehicle 36, so that vehicle 44 is followed at an appropriately large time gap. In this situation, command device 28 at point in time t1, that lies briefly before point in time ta, determines the output of an acceleration command. Vehicle 36 is accelerated, while vehicle 44 continues at constant speed. This manifests itself in FIG. 3 in that curves d44 and s44 bend downwards from t1 on. The acceleration setting in at t1 is perceptible to the driver of vehicle 36, and represents a signal for him or a request to initiate a passing procedure, and to change lanes.

In the time interval between t1 and ta1, the driver confirms this request by activating blinker switch 30. If this confirmation does not take place at the latest at point ta1, command device 28 would break off the acceleration procedure, and the speed control system would return to normal clearance control.

The steering maneuver for the actual lane change is left to the driver. If the driver does not undertake the lane change, at point tmax the minimum distance dmin to vehicle 44 would be undershot. In order to avoid this, the acceleration procedure is broken off already at a suitably calculated, earlier point ta2, if the driver has not carried out the lane change until that time.

In the example shown, the passing request is confirmed and implemented, so that the acceleration procedure is continued. At point in time t0, vehicle 44 is passed at a speed which, because of the acceleration procedure, is slightly above the desired speed originally selected by the driver. Thereafter, command device 28 induces a deceleration of the vehicle, until it has returned again to the desired speed.

The acceleration procedure induced by command device 28 would, in this situation, not be necessary for passing, since vehicle 36 is going faster than vehicle 44 in any case. However, this acceleration procedure fulfills a twofold function within the scope of the present invention. On the one hand, it is used as a lane changing request for the driver, and, on the other hand, it accelerates and abbreviates the passing procedure. This is of advantage, for example, in cases in which a vehicle, that has not yet been located by the rear-facing radar, approaches rapidly in the passing lane, or in cases in which, ahead of vehicle 44, in lane 32, there is an even slower vehicle which forces the driver of vehicle 44 either to brake, or to initiate, on its part, a passing procedure.

The determination that the acceleration command is output at point t1, that is, shortly before the point in time at which the ACC clearance control would set in, has the advantage that a consistent, quiet driving behavior is achieved, and vehicle 36 is not first decelerated and then still accelerated again for the acceleration procedure.

Figure 4:
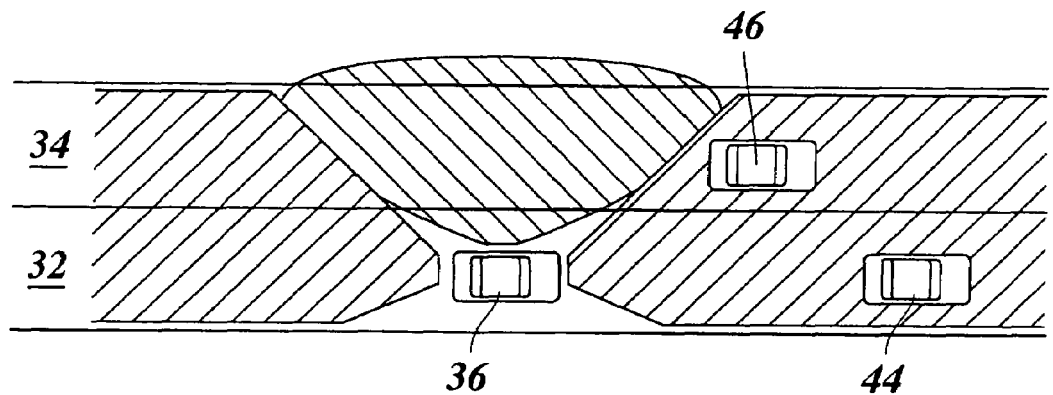
FIG. 4 shows a sketch of another traffic situation.
Figure 5:
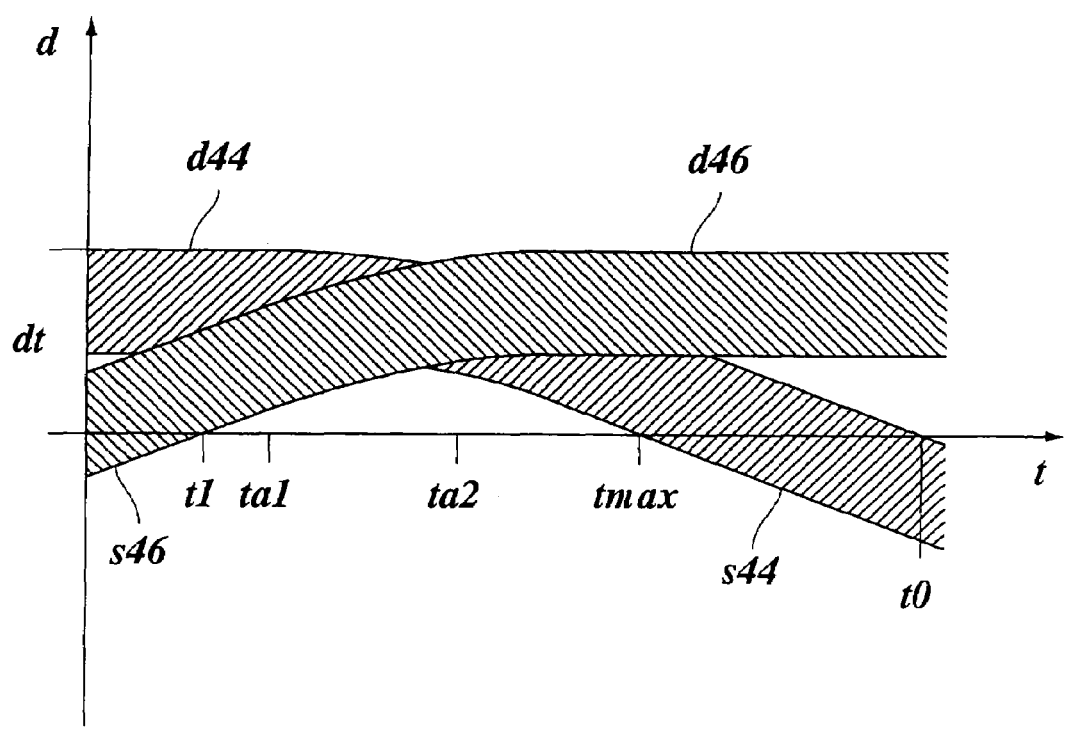
FIG. 5 shows a path/time diagram on what is shown in FIG. 4.

FIGS. 4 and 5 illustrate a modified traffic situation, in which, ahead of vehicle 36 in adjacent lane 34, there is traveling an additional vehicle 46, that is located by front radar 14. In FIG. 5, the distance of vehicle 46 is represented by the curve d46, and curve s46 represents the corresponding minimum distance.

In the time period preceding the situation shown in FIG. 4, vehicle 46 was first located by rear-facing radar 20 and then by very close range sensor 22. Recognition device 26 has recognized that adjacent lane 34 is not free, and that, therefore, no lane changing request was output. Instead, speed control system 10 has reduced the speed of vehicle 36 to the speed of vehicle 44. This may be seen in FIG. 5 by the fact that curve d44 first runs horizontally. Vehicle 44 is followed by vehicle 36 at a constant distance dt, which corresponds to the setpoint time gap set in the ACC system. This distance is greater than dmin.

At point t1 in FIG. 5, the distance of vehicle 46 becomes greater than minimum distance dmin. At the earliest at this point t1, vehicle 36 may change to adjacent lane 34, without the minimum distance from vehicle 46 being undershot. In the example shown, command device 28 is therefore designed in such a way that, in this situation, only at point t1 the acceleration command is output, and therewith the lane changing request. Thus the driver is not tempted to change to the adjacent lane too early.

Vehicle 36 is now accelerated, either to the desired speed selected by the driver or if, as in the example shown, the speed of vehicle 46 is less, to the speed of vehicle 46, which then, after the driver has undertaken the lane change, is followed in adjacent lane 34 at a distance dt. The time window available to the driver for the lane change is, in this case, limited by points t1 and ta2. At t0 vehicle 44 is finally passed.

As in the case described above, a break-off point ta1 is established by the lane changing assistant, up to which the driver must have accepted the lane changing request.

Figure 6:
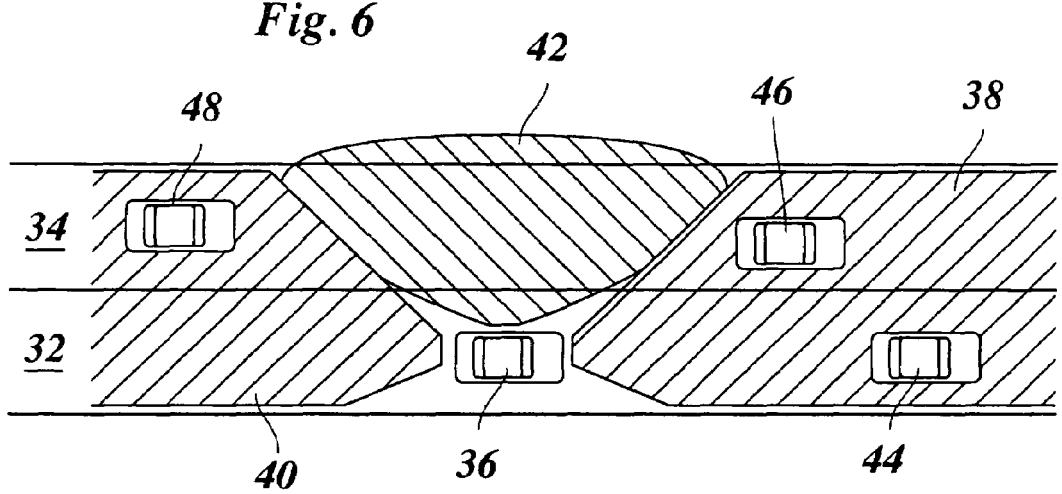
FIG. 6 shows a sketch of an additional traffic situation.
Figure 7:
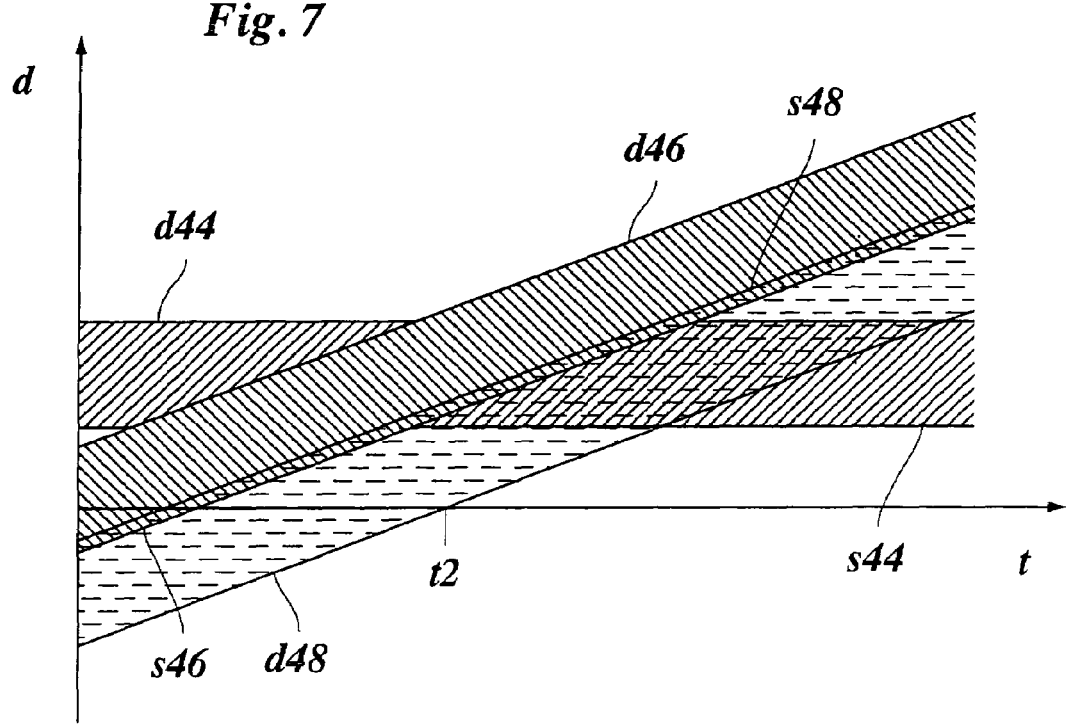
FIGS. 7 to 9 show path/time diagrams on what is shown in FIG. 6.

FIGS. 6 and 7 show an additional traffic situation which clearly differs from the situation in FIGS. 4 and 5 by the fact that, in adjacent lane 34, a still further vehicle 48 follows behind vehicle 46, which is located by rear-facing radar 20 of vehicle 36. The distance of vehicle 48 measured by the rear-facing radar is shown in FIG. 7 by curve d48. Curve s48 represents the appertaining minimum distance between vehicles 48 and 36. Vehicles 46 and 48 travel at the same speed, and their mutual distance is less than the sum of the minimum distances dmin, so that, in FIG. 7, the "forbidden zones", which are bordered by curves d46 and s46 on the one side and curves d48 and s48 on the other side, overlap with each other. Recognition device 26 thus determines that, between vehicles 46 and 48 no window is open for a safe lane change. Accordingly, the acceleration command does not happen, and all vehicles continue their travel at constant speed. At the earliest at point t2 could an acceleration command be given out, if vehicle 48 is not followed by an additional vehicle.

When vehicle 48 leaves locating range 40 of the rear-facing radar, it enters locating range 42 of the very close range sensor, and in this case, too, recognition device 26 recognizes that the lane changing window continues to be closed. At point t2, vehicle 48 is already located within locating range 38 of the front radar, so that its relative speed may be measured.

Figure 8:
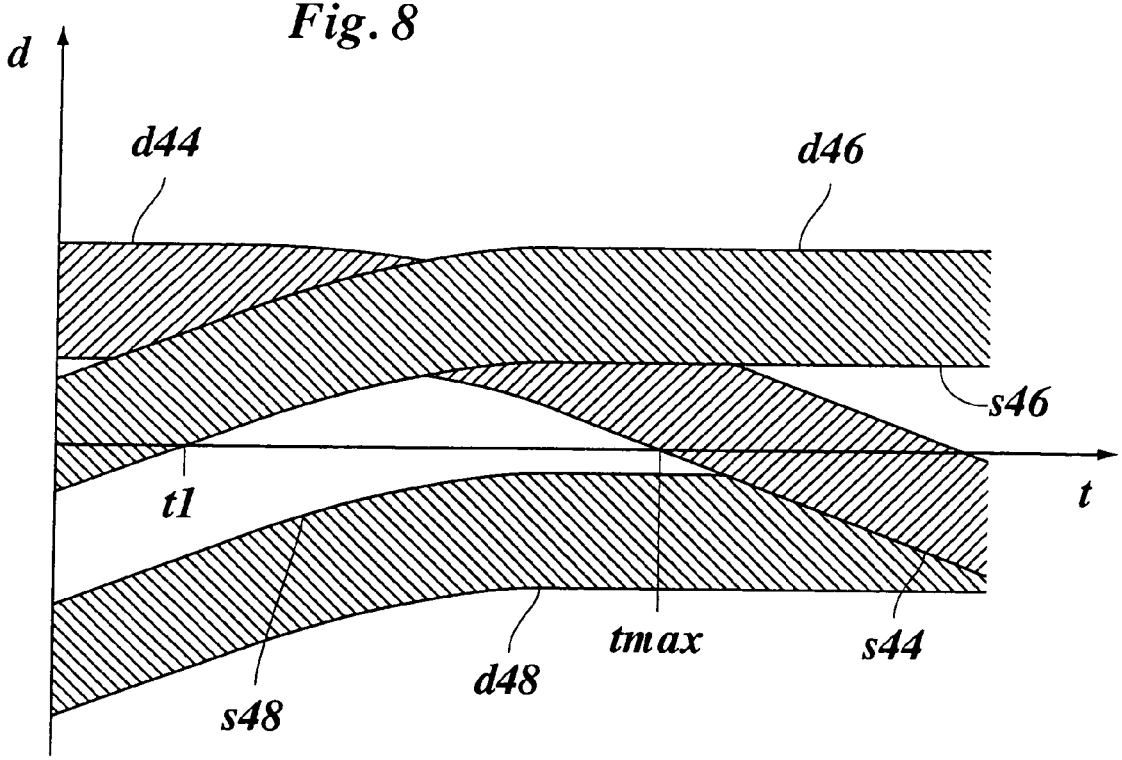

FIG. 8 illustrates a similar situation to that in FIG. 7, with only the difference that now the distance between vehicles 46 and 48 is greater, so that, between curves s46 and s48 a window opens up for a lane change without danger. Accordingly, at t1 the acceleration command is given by command device 28. The target speed to which vehicle 36 is accelerated is, in this case, equal to the agreeing speed of vehicles 46 and 48. The magnitude of the acceleration is selected by command device 28, within firmly specified comfort limits, at a magnitude at which the distance between vehicles 36 and 48 is at no point in time less than dmin, i.e. curve s48 does not reach the t axis. It is thereby ensured that a sufficient minimum distance from vehicle 48 is maintained, without vehicle 48 having to reduce its speed, independent of at which point in time, within the window, the driver undertakes the lane change.

Figure 9:
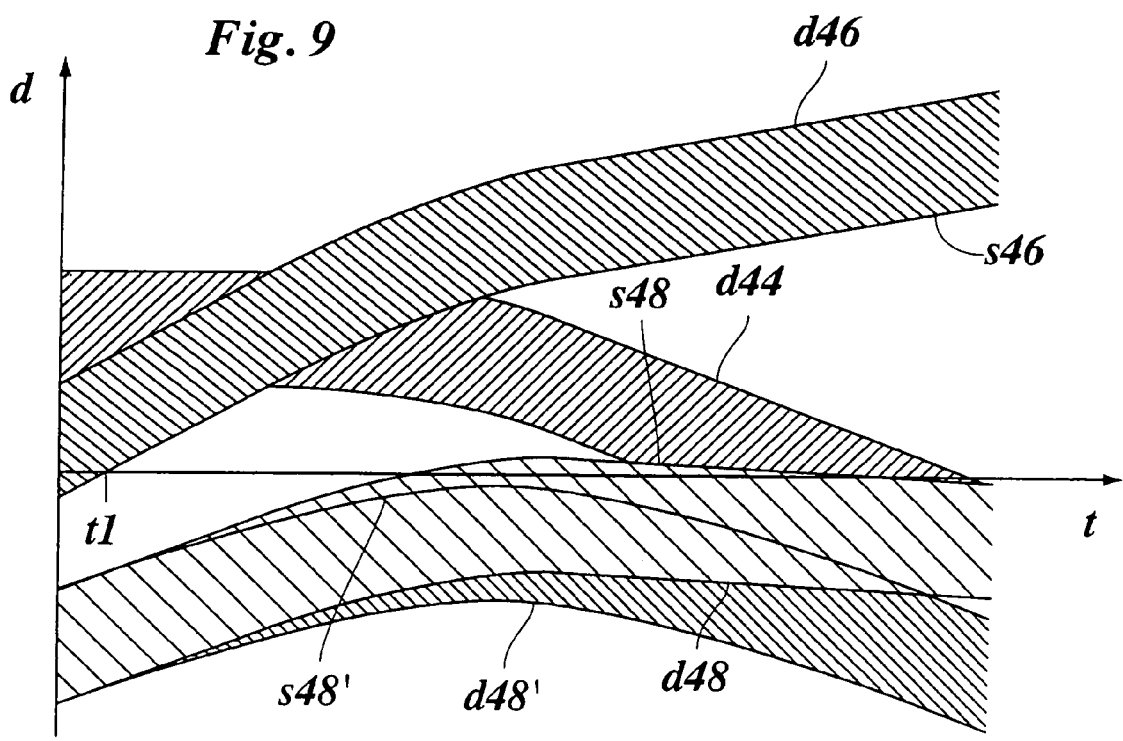

FIG. 9 illustrates a situation which differs from the situation according to FIG. 8 in that vehicle 46 has a higher speed, which is greater than the desired speed for vehicle 36. The speed of vehicle 48 is somewhat less than the desired speed, so that the distance between vehicles 48 and 36 (curve d48) increases again at the end of the acceleration procedure. However, at point t1, at which the acceleration command is given, vehicle 48 has already approached vehicle 36 so closely that the distance between vehicles 48 and 36 undershoots the minimum distance, even at maximum possible or permissible acceleration of vehicle 36. In FIG. 9 this may be recognized by the fact that curve s48 temporarily rises above the t axis. This means that, if the driver of vehicle 48 continues to travel at undiminished speed, the minimum distance is temporarily undershot. Consequently, the driver of vehicle 48 is forced, on his part, to decelerate the vehicle, in order to maintain the minimum speed. This is shown symbolically in FIG. 9 by curves d48' and s48'.

This situation is permitted, in the exemplary embodiment described, under the condition that the forced deceleration of vehicle 48 remains below a certain acceleration boundary value or deceleration boundary value. This boundary value is selected in such a way that the driver of vehicle 48 is not excessively impeded and in any case not endangered, and should, in fact, be selected so that the required deceleration of vehicle 48 is less than the typical engine braking effect of a vehicle, so that the driver of vehicle 48 is not forced actively to put on the brakes.

To the extent that the acceleration capacity of vehicle 36 permits it, the slight hindrance of vehicle 48 may also be avoided in that the comfort limit for the acceleration of vehicle 36 is increased.

A comparable situation, in which an undershooting of the minimum distance may occur, even if the acceleration capacity of vehicle 36 is sufficient, is derived if the desired speed for vehicle 36 is less than the speed of vehicle 48. Even in this case, the driver of vehicle 48 is finally forced to reduce his speed. A possible countermeasure is temporarily to raise the target speed for vehicle 36 above the desired speed, in order to give more time for speed adjustment to the driver of vehicle 48.

In general, for the acceleration of vehicle 36, in the acceleration procedure triggered by command device 28, one would select a boundary value, from a comfort point of view, which does not exhaust the actual acceleration capacity of the vehicle. However, this boundary value may vary as a function of the situation. For example, one may admit greater accelerations if the discrepancy between the speed of preceding vehicle 44 and the desired speed is very large. It is also conceivable that, at a high traffic density, the acceleration boundary is increased, so that the probability is enhanced of finding a suitable window for a lane change without danger.

Whereas in the situations shown in FIGS. 8 and 9 point in time t1, at which the acceleration command is issued, is in each case picked in such a way that it occurs at the same point at which front vehicle 46 has reached the minimum distance dmin on the adjacent lane (the intersection of curve s46 with the t axis), in a modified specific embodiment, the acceleration command may also be issued already at an earlier point in time. Thereby, too, the chance improves of finding a suitable lane changing window. It is true that, in this context, one should take into consideration that, in that case, point in time tmax is also reached earlier, and that, in the case of a break-off of the acceleration procedure, a sufficient deceleration path must remain without letting vehicle 36 drive up too close to front vehicle 44. When there is great traffic density, therefore, it may be expedient, within the scope of normal ACC control, to increase the time gap that determines distance dt, so that a greater "start-up" path is available.

What is claimed is:

1. A lane changing assistant for a motor vehicle, comprising:
   a speed control system;
   a surroundings sensor system for recording a traffic environment including traffic in an adjacent lane;
   a decision device for deciding whether a lane changing request of a driver is to be accepted;
   a command device for issuing an acceleration command to the speed control system in the case of the lane changing request; and
   a recognition device for recognizing a window for moving into the adjacent lane without danger, based on data of the surroundings sensor system, wherein the command device computes an acceleration strategy adjusted to the window, including a point in time for beginning of an acceleration;
   wherein, in response to an issuance of an acceleration command, the command device transmits a lane changing signal to the driver in the form of a perceptible initial acceleration.

2. The lane changing assistant as recited in claim 1, wherein the lane changing signal is a signal whereby the lane changing request signaled by the driver is accepted.

3. The lane changing assistant as recited in claim 1, wherein:
   the lane changing signal is a lane changing request, and
   the command device breaks off the acceleration strategy if the lane changing request has not been confirmed by an action of the driver within a prespecified time span.

4. The lane changing assistant as recited in claim 1, wherein the recognition device evaluates the suitability of windows for moving into the adjacent lane, as a function of a boundary value for the acceleration of the motor vehicle.

5. The lane changing assistant as recited in claim 4, wherein the recognition device varies the boundary value as a function of a situation.

6. The lane changing assistant as recited in claim 1, wherein the recognition device includes signal inputs for a plurality of sensors of the surroundings sensor system, one of the plurality of sensors monitoring a rear space in the adjacent lane behind the motor vehicle, and another one of the plurality of sensors monitoring the adjacent lane at a level of the motor vehicle.

* * * * *